United States Patent
Fausak et al.

(10) Patent No.: US 9,935,790 B2
(45) Date of Patent: Apr. 3, 2018

(54) VIRTUAL CHANNEL VIRTUAL PRIVATE NETWORK

(71) Applicant: Dell Products L.P., Round Rock, TX (US)

(72) Inventors: Andrew T. Fausak, San Jose, CA (US); Oleg Rombakh, Los Gatos, CA (US)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 14/792,021

(22) Filed: Jul. 6, 2015

(65) Prior Publication Data
US 2016/0234040 A1 Aug. 11, 2016

Related U.S. Application Data

(60) Provisional application No. 62/115,047, filed on Feb. 11, 2015.

(51) Int. Cl.
| | |
|---|---|
| *H04L 12/46* | (2006.01) |
| *H04L 29/08* | (2006.01) |
| *H04L 9/32* | (2006.01) |
| *H04L 29/06* | (2006.01) |

(52) U.S. Cl.
CPC ........ *H04L 12/4679* (2013.01); *H04L 9/3213* (2013.01); *H04L 12/4641* (2013.01); *H04L 63/0272* (2013.01); *H04L 63/0807* (2013.01); *H04L 63/10* (2013.01); *H04L 63/102* (2013.01); *H04L 67/025* (2013.01); *H04L 67/08* (2013.01); *H04L 67/1002* (2013.01); *H04L 67/141* (2013.01); *H04L 67/142* (2013.01); *H04L 67/148* (2013.01); *H04L 67/2814* (2013.01); *H04L 67/38* (2013.01); *H04L 67/42* (2013.01); *H04L 69/04* (2013.01); *H04L 69/14* (2013.01); *H04L 63/08* (2013.01); *Y02B 60/33* (2013.01)

(58) Field of Classification Search
CPC .................................................. H04L 12/4679
USPC .......................................................... 709/228
See application file for complete search history.

(56) References Cited

U.S. PATENT DOCUMENTS

| | | | |
|---|---|---|---|
| 7,089,584 B1 | 8/2006 | Sharma | |
| 7,467,217 B2 | 12/2008 | Fausak | |
| 7,486,695 B1 * | 2/2009 | AbdelAziz | .......... H04L 12/4633 370/338 |

(Continued)

FOREIGN PATENT DOCUMENTS

EP 1041496 10/2000

OTHER PUBLICATIONS

Hoffman, "How to Forward Ports to a Virtual Machine and Use It as a Server", Aug. 26, 2012, www.howtogeek.com (5 pages).*

*Primary Examiner* — Wing F Chan
*Assistant Examiner* — Leon Y Tseng
(74) *Attorney, Agent, or Firm* — Baker Botts L.L.P.

(57) ABSTRACT

A system and method of implementing a virtual channel virtual private network is disclosed. In one embodiment, a remote desktop protocol (RDP) client is connected to a RDP server. The RDP client requests a virtual connection to a first computing device. A virtual channel for the RDP connection is created. A client application or client gateway is bound to the first virtual channel at the RDP client. The RDP server establishes a connection to a server application or a server gateway, and binds the connection to the first virtual channel.

20 Claims, 3 Drawing Sheets

(56) References Cited

U.S. PATENT DOCUMENTS

| | | |
|---|---|---|
| 7,712,137 B2 | 5/2010 | Meier |
| 8,316,237 B1 | 11/2012 | Felsher |
| 8,392,969 B1 | 3/2013 | Park |
| 8,418,233 B1 | 4/2013 | Hughes |
| 8,607,054 B2 | 12/2013 | Ramarathinam |
| 8,892,453 B2 | 11/2014 | Nakamura |
| 8,976,384 B1 | 3/2015 | Marquardt |
| 9,098,972 B2 | 8/2015 | Shimabukuro |
| 9,225,799 B1 | 12/2015 | Dong |
| 2002/0094090 A1 | 7/2002 | Lino |
| 2003/0079042 A1 | 4/2003 | Yamanaka |
| 2004/0073792 A1 | 4/2004 | Noble |
| 2004/0143746 A1 | 7/2004 | Ligeti |
| 2005/0192099 A1 | 9/2005 | Nguyen |
| 2006/0265436 A1 | 11/2006 | Edmond |
| 2006/0266832 A1 | 11/2006 | Howarth |
| 2007/0204166 A1 | 8/2007 | Tome |
| 2007/0282951 A1 | 12/2007 | Selimis |
| 2009/0144469 A1 | 6/2009 | Brundridge |
| 2009/0150550 A1 | 6/2009 | Barreto |
| 2009/0183225 A1 | 7/2009 | Malakapalli |
| 2009/0210456 A1 | 8/2009 | Subramaniam |
| 2010/0246602 A1 | 9/2010 | Barreto |
| 2010/0250770 A1 | 9/2010 | Barreto |
| 2011/0126110 A1 | 5/2011 | Vilke |
| 2011/0153716 A1 | 6/2011 | Malakapalli |
| 2011/0153838 A1 | 6/2011 | Belkine |
| 2011/0276699 A1 | 11/2011 | Pedersen |
| 2012/0021721 A1 | 1/2012 | Reed |
| 2012/0029691 A1 | 2/2012 | Mockus |
| 2012/0096271 A1 | 4/2012 | Ramarathinam |
| 2012/0191980 A1 | 7/2012 | Kennedy |
| 2012/0246476 A1 | 9/2012 | Zhuang et al. |
| 2012/0297026 A1 | 11/2012 | Polis |
| 2013/0091239 A1 | 4/2013 | Hao |
| 2013/0298104 A1 | 11/2013 | Kletsky |
| 2014/0082715 A1 | 3/2014 | Grajek |
| 2014/0304418 A1 | 10/2014 | Torok |
| 2016/0036908 A1 | 2/2016 | Aggarwal |
| 2016/0234195 A1 | 8/2016 | Fausak |
| 2016/0234196 A1 | 8/2016 | Fausak |
| 2016/0234216 A1 | 8/2016 | Fausak |
| 2016/0234286 A1 | 8/2016 | Fausak |
| 2016/0234343 A1 | 8/2016 | Fausak |

\* cited by examiner

VIRTUAL CHANNEL VIRTUAL PRIVATE NETWORK

RELATED APPLICATION

This application claims the benefit, under 35 U.S.C. § 119(e), of U.S. Provisional Patent Application No. 62/115,047, filed 11 Feb. 2015, which is incorporated herein by reference.

TECHNICAL FIELD

This disclosure relates generally to information handling systems and, more particularly, to creating a Virtual Private Network (VPN) through virtual channels.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
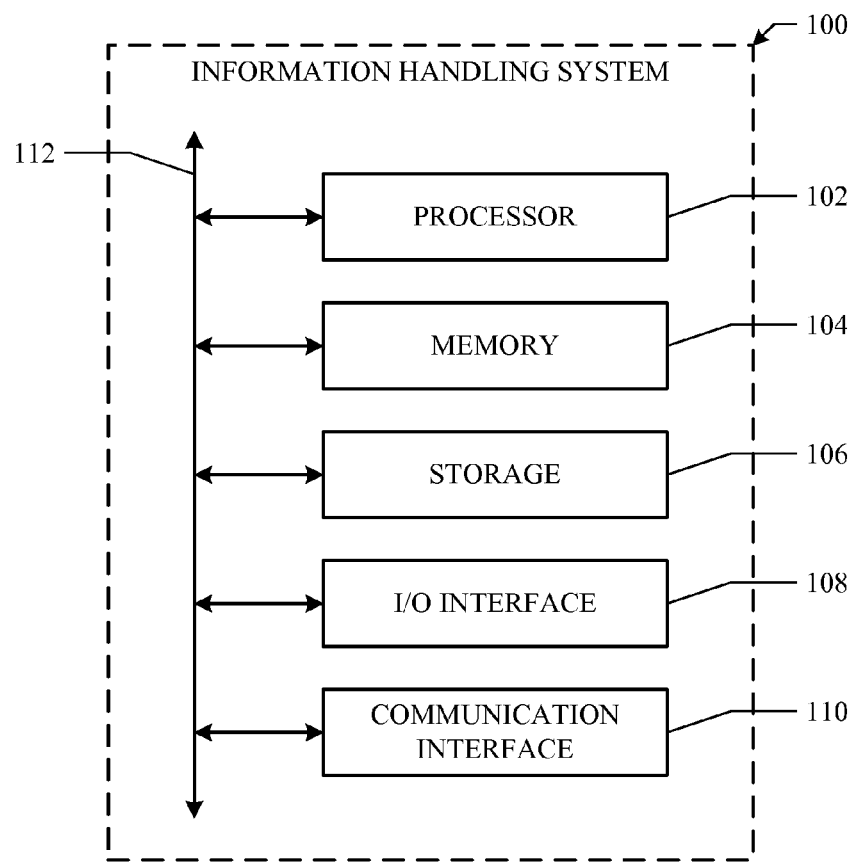
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 2:
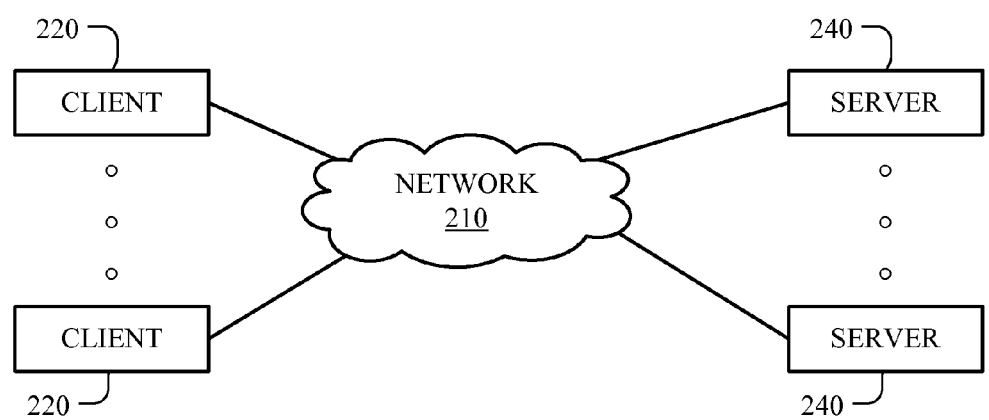
FIG. 2 depicts an exemplary network environment.

Particular embodiments are best understood by reference to FIGS. 1-2, wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

FIG. 2 illustrates an example configuration of networked information handling system (e.g. client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client device 220 may access resources provided by a server 240 only after providing suitable authentication information. Alternatively, a server 240 may provide software or other resources automatically to one or more client devices 220.

It may be desirable, in the case of a private (e.g. corporate) network including multiple sites or subnets to deploy software (including, e.g., all or part of one or more operating systems, applications, add-ons, or data) to one or more client devices 220 across one or more sites or subnets. The client devices 220 may, for example, be located remotely from one or more servers 240 (including, e.g., device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (e.g. videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more client devices 220 (e.g. thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (e.g. automatically) device discovery, tracking of assets (e.g. hardware or software inventory) at client devices, monitoring the status or health of client devices, applying one or more policies to client devices (including, e.g., network settings of the client devices), or remote administration and shadowing of client devices. The device manager may deliver any suitable resources including, for example, operating systems, add-ons, content, or any other suitable data, applications, or images to one or more thin client devices 220 of network 210.

In particular embodiments, a client device such as client device 220 (e.g. a thin client) may be designed with minimal or limited storage capacity (e.g. in a hard disk). The client device may be required, however, to run an operating system such as WINDOWS EMBEDDED or WINDOWS SERVER, but the footprint of the operating system may grow over time with newer releases or updates. Hence, client devices may, over time, begin to run low on free storage space (e.g. in the hard disk). Unwanted files may be deleted or full volume compression of the storage medium (e.g. the hard disk) may be implemented to increase available storage space. However, full volume compression may introduce performance shortcomings (e.g. increased number of instruction cycles required to compress/uncompress data in the volume) from the point of view of an end user of the client device. In particular embodiments, optimized volume compression may be implemented to reduce effective disk usage on a client device while minimizing impact on system performance.

In particular embodiments, servers 240 may operate in one or more private networks that are incompatible with network 210. In particular embodiments, network 210 may be an untrusted network to servers 240 operating behind one or more firewalls. In particular embodiments, client devices 220 may utilize data encryption for transporting unencrypted data traffic over one or more encrypted tunnels that bypass the firewalls. As an example and not by way of limitation, client device 220 may set up an encrypted secure shell (SSH) tunnel to a targeted server 240 in order to access network service provided by the targeted server 240. In particular embodiments, client device 220 may be configured to forward a pre-determined local port to a port on the targeted server 240. Once the encrypted SSH tunnel has been established, client device 220 may connect to the pre-determined local port to access the network service of the targeted server 240. Accordingly, the encrypted SSH tunnel may provide security to unencrypted data traffic associated with the network service. In particular embodiment, client devices 220 may communicate with servers 240 via a proxy server. As an example and not by way of limitation, one of servers 240 behind the firewalls may be the proxy server (gws) (e.g. HTTP proxy) such that client device 220 may connect to the proxy server in order to access network service of another server 240 that is coupled to the proxy server. In particular embodiments, client device 220 may utilize transport gateway client (gwc) to issue a request (e.g. HTTP CONNECT method) for connecting to the transport gateway server (gws 300) or proxy server. Thereafter, the proxy server may tunnel (or proxy) a transmission control protocol (TCP) based connection to that server 240 and relay data traffic between that server 240 and client device 220.

Figure 3A:
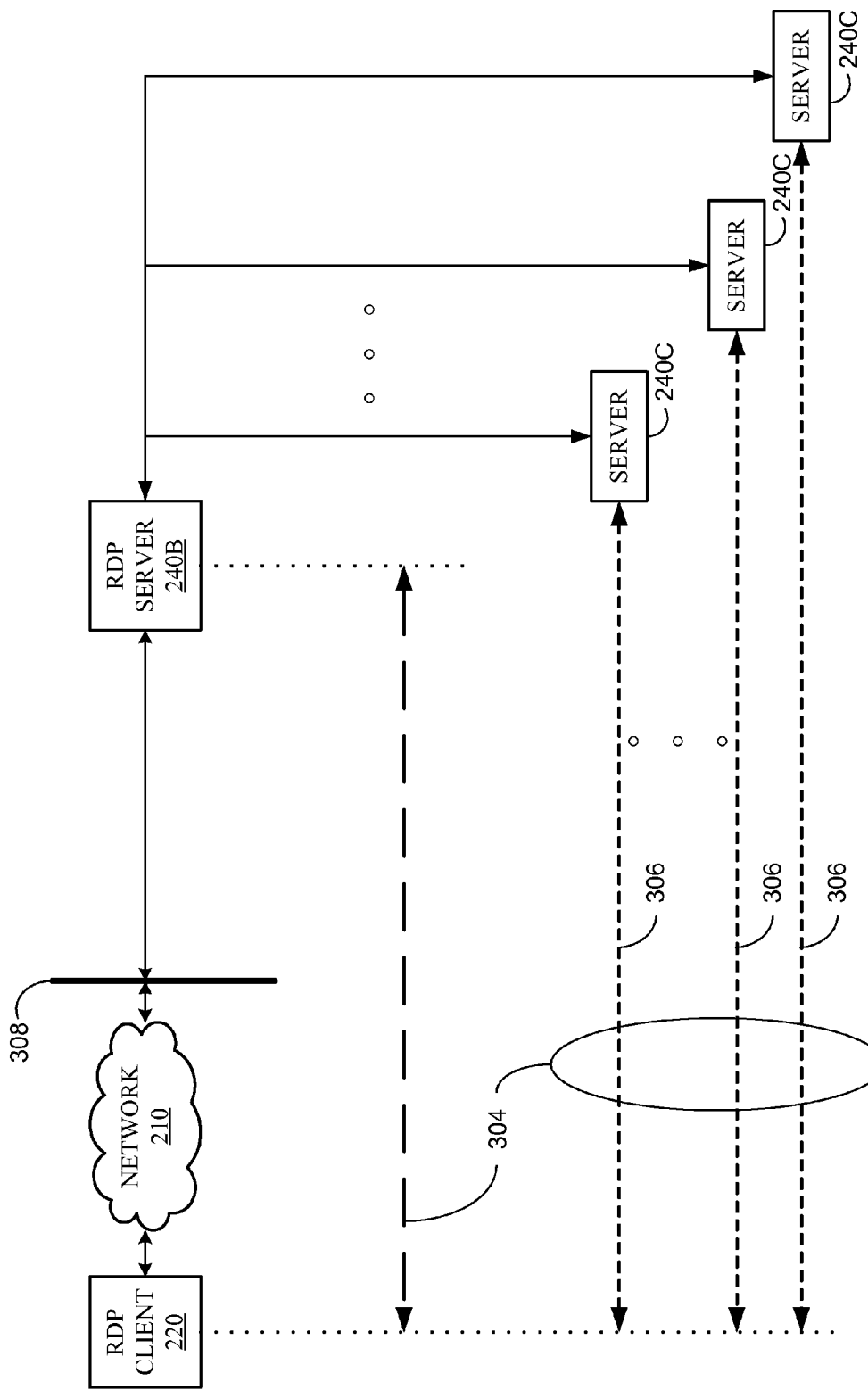
FIG. 3A is an example of a network environment utilizing RDP.

FIG. 3A illustrates a network environment utilizing an application that has virtual channels, which is a means to provide data pathway using a provision of an existing protocol. As an example and not by way of limitation, such an application may be a Remote Desktop Protocol Client (RDPc). In particular embodiments, RDPc 220 may be a personal computer, a laptop computer, a thin client, a mobile device, or any other information handling system with an RDP client protocol implementation. In particular embodiments, RDPc 220 may be associated with one or more sites (e.g. subnets) of network 210. In particular embodiments, communication to servers 240 may occur through one or more trusted and secure private networks. As an example and not by way of limitation, the trusted and secure private networks may be associated with one or more enterprise networks. In particular embodiments, RDP client device 220 of network 210 may not be secure or trusted. For example, RDP client device may be a customer's device, a website visitor's device, or an employee's device (such as in a "bring your own device" environment). As an example and not by way of limitation, network 210 may comprise a public network, such as the Internet, or a third-party network. Network 210 may be untrusted, for example the network may have substantially low security. In order to protect servers 240 against potential security threats from network 210 and RDP client device 220, a firewall 308 may establish one or more barriers that screen incoming and outgoing data traffic between servers 240 and RDP client device 220. In particular embodiments, firewall 308 may comprise one or more of a software-based network security system or a hardware-based network security system that screen the data traffic according to one or more pre-determined routing rule-sets. In particular embodiments, firewall 308 may comprise one or more network security systems developed by Microsoft Corporation. Furthermore, servers 240 may be deployed using Microsoft Enterprise servers. Herein, reference to the network security systems developed by Microsoft Corporation includes, but is not limited to, Microsoft Enterprise-based firewalls.

In particular embodiments, RDP server 240B may be a Microsoft Windows server providing Remote Desktop Services. In particular embodiments, RDP server (RDPs) 240B may comprise a device manager that manages RDP client device 220, as described above. In particular embodiments, servers 240C may include one or more services that a client-side operation may desire to connect to, or other servers that provide services to be accessed by a client, such as RDP Client 220, applications co-located with RDP Client 220, a port-forward within RDP Client 220, or virtual network through RDP Client 220. For example, servers 240C may comprise Microsoft Windows servers, Microsoft Enterprise servers, UNIX/LINUX servers, etc. Examples of services provided by servers 240C include, but are not limited to, file sharing, video streaming, audio streaming, database access, instant messaging, telephony, or video conferencing.

Figure 3B:
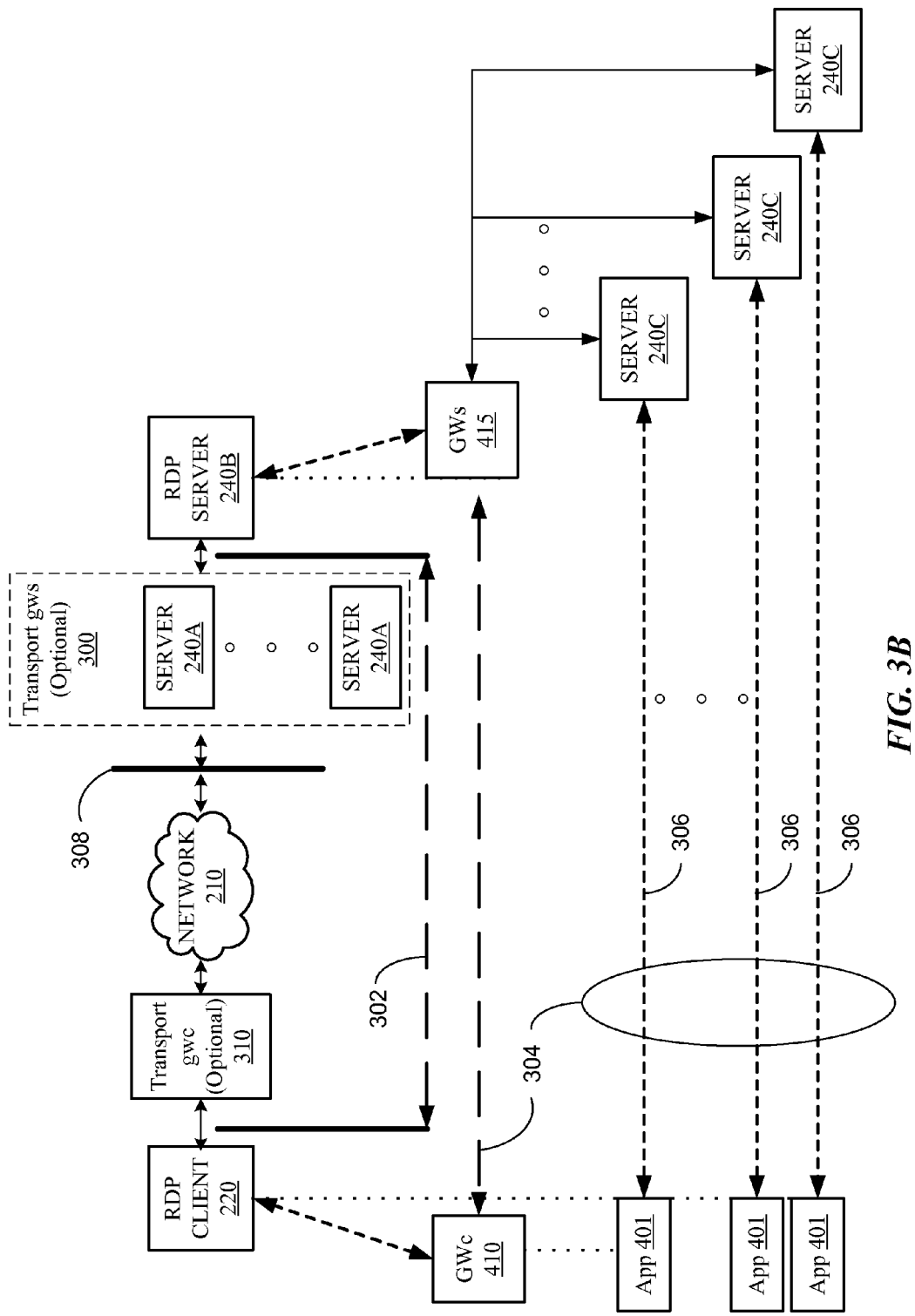
FIG. 3B is an example of a network environment utilizing RDP.

In the example network environment of FIG. 3B, one or more RDP virtual channel is used to create a virtual private network between RDP client device 220 and one or more servers 240C, by attaching gateway functions (GWc//GWs) to each end of the RDP virtual channels. In a particular embodiment, firewall 308 is configured to permit an inbound RDP connection from RDP client 220 to RDP server (RDPs) 240B. After establishing the RDP connection (RDPc//RDPs) 302, RDP client 220 may create one or more RDP virtual channels 304 over the established RDP connection. For example, a user may desire to play an audio stream provided by a server 240C using an audio player application concurrently running on RDP client device 220. To provide access to the remote audio stream, Gateway client (GWc) 410 located within RDP client device 220 may establish a tunnel and channel using specialized Gateway service (GWs) attachment through RDP virtual channel connection 304 to RDP server 240B and again through specialized GWs 415 terminating the RDPs virtual channel. RDP server 240B may be configured to permit such a request to specialized GWs functionality on the RDPs. GWs 415 attached to RDP virtual channel 240B may provide access to the stream hosted by server 240C using any acceptable means, such as port forwarding. For example, in response to a request from GWc connected to virtual channel within RDP client 220, RDP server 240B may enable a configured port forward from RDPc 220 to RDP server 240B such that packets received from the RDP virtual channel 304 are encoded and forwarded in such a manner that the server through GWs routes appropriately to 240C the machine that hosts the audio stream. Specialized GWs connected to virtual channel linked to RDP server 240B's virtual channel to GWc may also configure a port forward such that packets received from server 240C are forwarded over the RDP virtual channel and routed to player application on RDPc host device. Similarly, GWc attached through RDP client 220 may use port forwarding to give an audio player running concurrently with the RDP client on RDP client device 220 access to the audio stream. For example, a local port may be configured to forward packets received from the audio player to server 240C over the RDP virtual channel, with all sourcing, sinking and routing determined by GWc and GWs attachments at alternate ends of the virtual channel. In this fashion, the RDP client 220 may also forward packets received from server 240C over the RDP virtual channel back to the local port to the audio player (again through GWc//GWs tunnel protocol).

In another particular embodiment, a transport gateway may be used to provide access to a remote service. For example, an application running on RDP client 220 may require access to a service provided by server 240C. A gateway client (gwc) may be provided on RDP client 220. A corresponding gateway server (gws) may be provided network access of RDP server 240B, the server 240C providing the target service, or on a different server 240C. RDP client device 220 may request an RDP virtual channel 304 on the established RDP connection 302 to RDP server 240B. On the RDP client device 220, the gateway client (GWc) 410 and Gateway service (GWs) 415 are bound to the RDP virtual channel 304. On RDP server 240B, the RDP virtual channel 304 is bound to the gateway server 415. The application is then able to communicate with the remote service through the connection pathway. The connection pathway utilizing virtual channel through RDP connection may be denoted as GWc/RDPc//RDPs/GWs when a transport gateway is also utilized, the connection pathway may be described as GWc/RDPc/gwc//gws/RDPs/GWs when the transport gateway is utilized. "/" is used to denote a local binding, and "//" is used to denote a remote binding.

In other particular embodiments, only a gateway client or a gateway server may be provided. For example, an application on RDP client device 220 may not require a separate transport gateway client to access a transport gateway server. In such an embodiment, the application connects directly to the transport gateway server. Other particular embodiments are described with reference to FIG. 3B. RDP client device 220 may connect to RDP server 240B via firewall 308 and transport gateway (gws) 300. In particular embodiments, gateway 300 may comprise one or more of a proxy server (e.g. web proxy) or a connection manager. The proxy server or connection manager may be operated by one or more servers 240A. The proxy server may act as an intermediary for data transfer between RDP client device 220 and RDP server 240B.

In particular embodiments, gateway 300 may utilize Microsoft's Tunneling Service to allow RDP client device 220 to establish a tunnel to servers 240B or 240C (e.g. Microsoft Enterprise servers) via firewall 308 (e.g. Microsoft Enterprise-based firewall). Microsoft's Tunneling Service is an HTTPS-based tunneling service role that supports tunneling RDP connections. As an example and not by way of limitation, transport gateway (gws) 300 by use of client-side transport gateway (gwc) may encode the RDP data packets, serialized for transmission over HTTPS, received from RDP client 220 and translate the data packets into native RDP data packets (also known as RDP protocol data units) for use by RDP server 240B. In the example network environment of FIG. 3, gateway 300 may consist of one or more servers 240A. In particular embodiments, RDP server 240B may be a RDP session host such that RDP client device 220 may connect to the RDP server 240B. After establishing the RDP connection 302, RDP client 220 may create one or more RDP virtual channels 304 over the established RDP connection and attach specialized Gateway protocol to each end of the virtual channel (GWc//GWs)

410/415 and open connection 306 to specified server. For example, a user may desire to play an audio stream provided by a server 240C using SMBs on server and using an audio player application concurrently running on RDP client device 220. To provide access to the remote audio stream, RDP client 220 may request a RDP virtual channel 304 on the established connection 302 to RDP server 240B. RDP server 240B may be configured to permit such a request through GWc and GWs at each end of virtual channel. RDP server 240B may provide access to the stream hosted by server 240C through GWc 410 and GWs 415 using any acceptable means, such as port forwarding. For example, in response to a request from RDP client 220, RDP server 240B may configure a port forward from RDP Client Host 220 to RDP server 240B such that packets received from the RDP virtual channel's Gateway 306 are forwarded from 220 to the server 240C that hosts the audio stream. RDP server 240B may also configure a port forward such that packets received from server 240C are forwarded over the RDP virtual channel through the GWc//GWs definitions to enable complete communication. Similarly, RDP client 220 may use port forwarding to give an audio player running concurrently with the RDP client on RDP client device 220 access to the audio stream. For example, a local port may be configured to forward packets received from the audio player to server 240C over the RDP virtual channel's GWc//GWs attachments. The RDP client 220 may also forward packets received from server 240C over the RDP virtual channel gateway to the local port to the audio player. The connection pathway may be denoted AudioPlayer(smbClient):GWc/RDPc//RDPs/GWs: smbHost or AudioPlayer(smbClient):GWc/RDPc/gwc/gws/RDPs/GWs: smbHost where gwc 310 has corresponding connection to transport gws 300. In particular embodiments, the RDP gateway client is integrated with the RDP client software.

In another particular embodiment, a gateway may be used to provide access to a remote service. For example, an application running on RDP client 220 may require access to a service provided by server 240C. A gateway client (gwc 310) may be provided on RDP client 220. A corresponding gateway server may be provided on RDP server 240B (gws 300), the server 240C providing the target service, or on a different server 240C. After RDPc and RDPs are connected, RDP client device 220 may request an RDP virtual channel 304 on the established RDP connection 302 to RDP server 240B with corresponding tunnel channel through GWc// GWs pair at each end of virtual channel 304. On the RDP client device 220, the gateway client is bound to the RDP virtual channel 304. On RDP server 240B, the RDP virtual channel 304 is transparently attached through gws (300). The application is then able to communicate with the remote service through the connection pathway. The connection pathway may be denoted as GWc/RDPc/gwc//gws/RDPs when the gateway server is provided beyond firewall 308 within scope of RDP server 240B. The connection pathway may be denoted as GWc/RDPc/gwc//gws/RDPs/GWs where GWc and GWs are virtual channel attachments and gws may reside on a server other than RDP server 240B. In other particular embodiments, only a gateway client or a gateway server may be provided. For example, an application on RDP client device 220 may not require a separate gwc to access a gws. In such an embodiment, the application connects directly from RDPc to RDPs to establish a connection gateway through virtual channel using GWc and GWs.

In other particular embodiments, an Independent Computing Architecture (ICA) protocol supporting virtual channels may be used in place of the Remote Desktop Protocol. In such an embodiment, an ICA Client may be used in place of RDP Client 220, and an ICA Server may be used in place of RDP Server 240B. In other particular embodiments, HTTP may be used with a CONNECT method in similar fashion to virtual channels in RDP.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a first server:
receiving a request from a client device for a first connection;
establishing the first connection to the client device;
receiving a request from the client device to establish a virtual channel to a first computing device;
establishing a second connection to the first computing device;
establishing the virtual channel of the first connection;
creating a virtual private network by attaching one or more gateway functions to each end of the virtual channel; and
binding the second connection to the first computing device to the virtual channel of the first connection.

2. The method of claim 1, wherein binding the second connection to the first computing device to the virtual channel of the first connection comprises establishing port forwarding from the first server to the first computing device.

3. The method of claim 1, wherein establishing the second connection to the first computing device comprises launching a gateway server application.

4. The method of claim 3, wherein binding the second connection to the first computing device to the virtual channel of the first connection comprises binding the gateway server application to the virtual channel of the first connection.

5. The method of claim 1, wherein establishing a second connection to the first computing device comprises establishing a connection to a gateway server on a second computing device.

6. The method of claim 5, wherein binding the second connection to the first computing device to the virtual channel of the first connection comprises binding the connection to the gateway server on the second computing device to the virtual channel of the first connection.

7. The method of claim 6, wherein binding the second connection to the first computing device to the virtual channel of the first connection comprises establishing port forwarding from the first server to the second computing device.

8. One or more computer-readable non-transitory storage media embodying logic that is operable when executed to:
by a first server:
receiving a request from a client device for a first connection;
establishing the first connection to the client device;
receiving a request from the client device to establish a virtual channel to a first computing device;
establishing a second connection to the first computing device;
establishing the virtual channel of the first connection;
creating a virtual private network by attaching one or more gateway functions to each end of the virtual channel; and
binding the second connection to the first computing device to the virtual channel of the first connection.

9. The one or more computer-readable non-transitory storage media of claim 8, wherein binding the second connection to the first computing device to the virtual channel of the first connection comprises establishing port forwarding from the first server to the first computing device.

10. The one or more computer-readable non-transitory storage media of claim 8, wherein establishing the second connection to the first computing device comprises launching a gateway server application.

11. The one or more computer-readable non-transitory storage claim 10, wherein binding the second connection to the first computing device to the virtual channel of the first connection comprises binding the gateway server application to the virtual channel of the first connection.

12. The one or more computer-readable non-transitory storage media of claim 8, wherein establishing a second connection to the first computing device comprises establishing a connection to a gateway server on a second computing device.

13. The one or more computer-readable non-transitory storage claim 12, wherein binding the second connection to the first computing device to the virtual channel of the first connection comprises binding the connection to the gateway server on the second computing device to the virtual channel of the first connection.

14. The one or more computer-readable non-transitory storage media of claim 13, wherein binding the second connection to the first computing device to the virtual channel of the first connection comprises establishing port forwarding from the first server to the second computing device.

15. An information handling system comprising:
one or more processors; and
a memory coupled to the processors comprising instructions executable by the processors, the processors being operable when executing the instructions to:
by a first server:
receiving a request from a client device for a first connection;
establishing the first connection to the client device;
receiving a request from the client device to establish a virtual channel to a first computing device;
establishing a second connection to the first computing device;
establishing the virtual channel of the first connection;
creating a virtual private network by attaching one or more gateway functions to each end of the virtual channel; and
binding the second connection to the first computing device to the virtual channel of the first connection.

16. The information handling system of claim 15, wherein binding the second connection to the first computing device to the virtual channel of the first connection comprises establishing port forwarding from the first server to the first computing device.

17. The information handling system of claim 15, wherein establishing the second connection to the first computing device comprises launching a gateway server application.

18. The information handling system of claim 17, wherein binding the second connection to the first computing device to the virtual channel of the first connection comprises binding the gateway server application to the virtual channel of the first connection.

19. The information handling system of claim 15, wherein establishing a second connection to the first computing device comprises establishing a connection to a gateway server on a second computing device.

20. The information handling system of claim 19, wherein binding the second connection to the first computing device to the virtual channel of the first connection comprises binding the connection to the gateway server on the second computing device to the virtual channel of the first connection.

* * * * *